(12) United States Patent
Feldkirchner et al.

(10) Patent No.: US 7,823,830 B2
(45) Date of Patent: Nov. 2, 2010

(54) AIRCRAFT LUGGAGE COMPARTMENT

(75) Inventors: Erich Feldkirchner, Colomiers (FR); Thomas M. Bock, Grenade (FR)

(73) Assignee: Airbus SAS, Blagnac Cedex (FR)

( * ) Notice: Subject to any disclaimer, the term of this patent is extended or adjusted under 35 U.S.C. 154(b) by 466 days.

(21) Appl. No.: 11/813,521

(22) PCT Filed: Feb. 15, 2006

(86) PCT No.: PCT/EP2006/001370

§ 371 (c)(1),
(2), (4) Date: Aug. 7, 2007

(87) PCT Pub. No.: WO2006/087183

PCT Pub. Date: Aug. 24, 2006

(65) Prior Publication Data

US 2009/0121080 A1   May 14, 2009

Related U.S. Application Data

(60) Provisional application No. 60/653,075, filed on Feb. 15, 2005.

(30) Foreign Application Priority Data

Feb. 15, 2005   (DE) ................... 10 2005 006 887

(51) Int. Cl.
*B64C 1/20* (2006.01)

(52) U.S. Cl. .................. 244/118.1; 296/37.7; 312/248

(58) Field of Classification Search ............ 244/118.1, 244/118.2; 296/37.7, 37.8; 312/248; 224/29.5, 224/328, 311, 309, 282
See application file for complete search history.

(56) References Cited

U.S. PATENT DOCUMENTS

| 4,368,937 | A |   | 1/1983  | Palombo et al. |         |
|-----------|---|---|---------|----------------|---------|
| 5,456,529 | A | * | 10/1995 | Cheung         | 312/245 |
| 5,567,028 | A | * | 10/1996 | Lutovsky et al.| 312/246 |
| 5,820,076 | A |   | 10/1998 | Schumacher et al. |      |
| 5,823,472 | A | * | 10/1998 | Luria          | 244/118.1 |

(Continued)

FOREIGN PATENT DOCUMENTS

DE   4018362 A1   12/1991

(Continued)

*Primary Examiner*—Christopher P Ellis
(74) *Attorney, Agent, or Firm*—Christopher Paradies; Fowler White Boggs P.A.

(57) ABSTRACT

A luggage compartment for aircraft comprises a tilting floor, a flap and a suspension device. The tilting floor is designed for holding carry-on baggage and the like, and may be locked in an initial position and may be tilted to another position for easier loading or unloading. The loading edge height may be substantially lower than the initial height of the closed luggage compartment. For example, an interlocking mechanism may couple the opening and closing of a flap and the tilting of the floor from an initial position to the tilted position, such as a three-position handle that prevents release of the tilting floor until the flap is unlatched.

13 Claims, 7 Drawing Sheets

U.S. PATENT DOCUMENTS

| | | | | |
|---|---|---|---|---|
| 5,842,668 A | * | 12/1998 | Spencer | 244/118.1 |
| 5,934,615 A | * | 8/1999 | Treichler et al. | 244/118.5 |
| 5,988,565 A | * | 11/1999 | Thomas et al. | 244/118.1 |
| 6,045,204 A | * | 4/2000 | Frazier et al. | 312/247 |
| 6,318,671 B1 | | 11/2001 | Schumacher et al. | |
| 6,527,325 B2 | * | 3/2003 | Steingrebe et al. | 296/37.7 |
| 6,598,829 B2 | * | 7/2003 | Kamstra | 244/118.1 |
| 6,622,965 B1 | * | 9/2003 | Sergiy | 244/118.1 |
| 6,802,478 B2 | * | 10/2004 | Katori | 244/118.1 |
| 7,309,045 B2 | * | 12/2007 | Melberg et al. | 244/118.5 |
| 7,601,004 B2 | * | 10/2009 | Lamoree et al. | 439/11 |
| 2002/0101090 A1 | | 8/2002 | Steingrebe et al. | |
| 2003/0080247 A1 | | 5/2003 | Frazier | |
| 2004/0016847 A1 | | 1/2004 | Ritts | |
| 2004/0135030 A1 | | 7/2004 | Lau et al. | |

FOREIGN PATENT DOCUMENTS

| | | |
|---|---|---|
| EP | 1293383 A1 | 3/2003 |
| RU | 2219080 C1 | 12/2003 |

* cited by examiner

AIRCRAFT LUGGAGE COMPARTMENT

FIELD OF THE INVENTION

This field relates to luggage compartments for aircraft. In particular, this field relates to a luggage compartment for an aircraft, an aircraft comprising such a luggage compartment, the use of a luggage compartment in an aircraft, and a method for loading baggage in a luggage compartment.

BACKGROUND

Luggage compartments in aircraft are used for stowing and keeping carry-on baggage, clothing and the like. The luggage compartments are located to the left and right of the aisle at or slightly above passenger head level. Since the luggage compartments may not be suspended so high and thus prevent shorter individuals from storing baggage in the luggage compartment, taller individuals often find it impossible to stand up straight under many conventionally used compartments.

SUMMARY OF THE INVENTION

It is an object to provide for improved baggage stowage in aircraft.

According to an embodiment, a luggage compartment for aircraft comprises a tilting floor, a flap and a pivoted suspension device, wherein the flap has an open and closed position, and the tilting floor is capable of rotating around the suspension device from an initial position into a loading position with the flap in the open position.

This configuration of the luggage compartment may ensure that the luggage compartment may be suspended high enough that even tall individuals may stand up straight underneath it on the one hand, while also providing for a lower stowing edge height on the other hand, so that shorter individuals may load the luggage compartment without exertion. This is enabled by a tilting mechanism that enables the luggage compartment to be fixed high enough horizontally in its initial position, and tilt in its loading position, such that the front edge of the tilting floor is tilted down, also enabling shorter people to conveniently store items away. In one example, the tilting floor and suspension device may only be turned if the flap is in the open position. This means that the tilting floor may not tilt with the flap closed. As a result, the tilting floor is fixed securely in its initial position during normal flight operation, and may only be tilted down accordingly after the flap has been opened.

According to another embodiment, the luggage compartment comprises a first locking device, wherein the first locking device may be used to prevent the tilting floor from turning around the suspension device, and the first locking device may be released to allow the tilting floor to turn around the suspension device. This may ensure that a tilting motion of the floor only takes place once the user has actuated the first locking device.

In another embodiment, the first locking device may be locked into the initial position automatically by turning the tilting floor. This may ensure that, once the tilting floor has been turned into its initial position, it is automatically locked there, so that it can no longer be moved unless the user manually releases it. As a result, undesired tilting of the tilting floor can be prevented.

In another embodiment, the luggage compartment has a second locking device, wherein the flap may be held in the closed position by the second locking device, and the second locking device may be released, making it possible to open the flap. In one example, this advantage makes it impossible to unintentionally open the flap.

In another embodiment, the luggage compartment also comprises a coupling device for coupling the first locking device with the second locking device, wherein the coupling device is adapted in such a way that the first locking device may only be released once the second locking device has been released, and the coupling device is further designed in such a way that the second locking device may only be closed once the first locking device has been closed.

This may ensure that the tilting floor may only be tilted for loading or unloading the luggage compartment after the flap has been opened. The tilting floor may not be tilted before the flap is opened, thereby preventing the tilting floor from tilting and the flap then opening, for example, which may cause the carry-on baggage to accidentally fall out of the luggage compartment. In addition, the coupling means may allow one to lock the flap only once the tilting floor has been flipped back into its initial position. In one example, this ensures that users always first flip back the tilting floor before closing the flap. This may also help avoid the risk of an accident owing to falling carry-on baggage.

In another embodiment, the coupling device comprises a handle, wherein the handle has a first position, a second position and a third position, which may be assumed one after the other. The first position here corresponds to the handle in the resting position. The second position involves releasing the second locking device of the flap, so that the flap may be opened, and the third position involves releasing the first locking device, so that the luggage compartment may be turned around the suspension device.

Therefore, the first and second locking devices may be released one after the other using the same handle in the correct sequence. The user pulls on the handle, and as soon as the handle is in the second position, the flap is unlocked. As soon as the handle has then moved from the second position into the third position, the tilting floor is released, and may turn around its suspension axis.

In another embodiment, the suspension device is situated near a line that runs vertically through the center of gravity of the luggage compaitment in the initial position, so that only a slight torque is required for turning the tilting floor.

This represents a very significant advantage, in that only slight forces must be exerted in order to turn the tilting floor (with any carry-on baggage therein). Force enhancing means or elevated exertion by the user are not required.

In another embodiment, the suspension device encompasses a rotational axis, wherein the tilting floor has a first lateral wall and a second lateral wall, and wherein the rotational axis rigidly joins the first and second lateral wall, such that the forward and reverse forces, e.g., those produced by aircraft accelerations, may be absorbed by the combination of first lateral wall, second lateral wall and rotational axis.

Coupling both lateral walls via the rotational axis may provide for a stable combination, which may also absorb strong acceleration forces, e.g., of the kind that may arise during a crash.

In another embodiment, the luggage compartment also has a spring arrangement, wherein a minimum threshold force, which is necessary for turning the tilting floor, may be set via the spring arrangement.

The spring arrangement may make it possible to set a force that the user must exert to move the tilting floor out of its initial position, for example. In this case, the spring arrangement may dampen or provide support.

Another embodiment provides for a simple and reliable method with which the luggage compartment may be actuated on board an aircraft. The method here comprises the release of a second locking device for opening a flap of the luggage compartment, the release of a first locking device for turning a tilting floor of the luggage compartment from an initial position into a loading position, the loading of baggage into the luggage compartment, the application of a threshold force to turn the tilting floor back into the initial position, the closing of the first locking device for locking the tilting floor, the closing of the flap, and the closing of the second locking device for locking the flap.

Therefore, the method may make it possible to load or even unload the luggage compartment while the floor still remains horizontally locked upon actuation of the second locking device for opening the flap. Only when a second locking device is additionally actuated, the tilting floor may be turned into the desired loading/unloading position. The corresponding loading/unloading position of the front edge of the tilting floor is here located under the initial position owing to the rotation. This simplifies the loading process. The tilting floor may then be turned back, whereupon the flap may only be closed and locked after the initial position has been reached.

Preferred embodiments of this invention will be described below, drawing reference to the figures.

BRIEF DESCRIPTION OF THE FIGURES

The same reference numbers for identical or similar elements are used in the following figure description.

DETAILED DESCRIPTION

Figure 1:
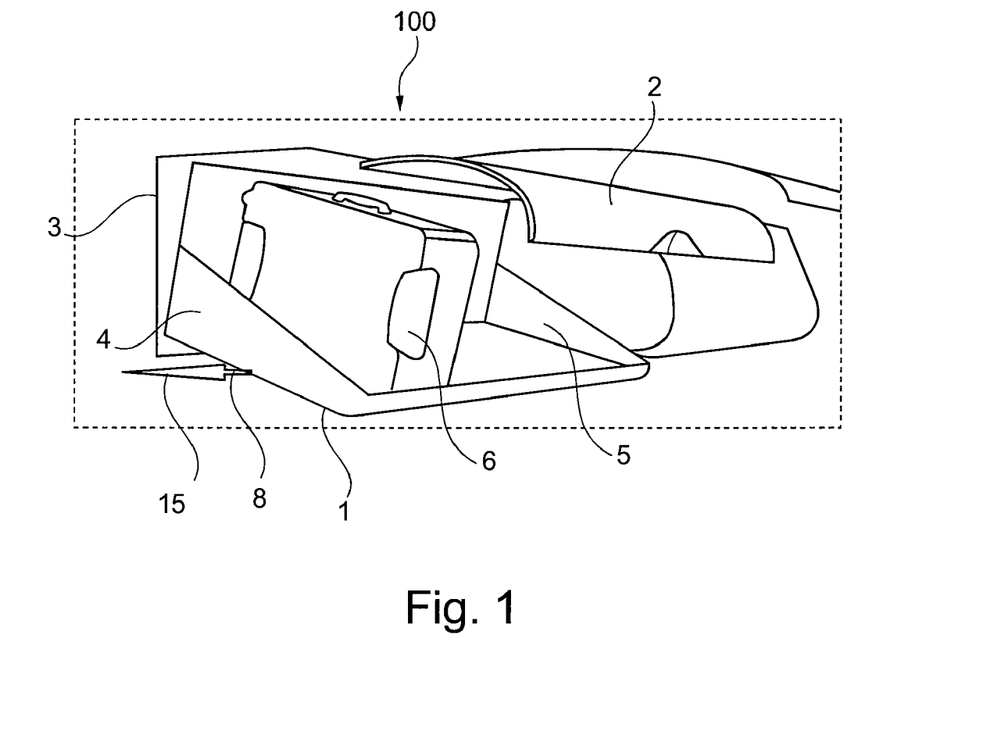
FIG. 1 shows a diagrammatic view of a luggage compartment for an aircraft according to one embodiment.

The examples described and drawings rendered are illustrative and are not to be read as limiting the scope of the invention as it is defined by the appended claims. FIG. 1 shows a first perspective, diagrammatic view of a luggage compartment according to one embodiment. As evident from FIG. 1, the luggage compartment 100 has a tilting floor 1 with a first lateral wall 4 and a second lateral wall 5. The two lateral walls 4, 5 are rigidly joined by way of a rotational axis (not shown on FIG. 1), which may be located on the tilting floor 1, for example. The rotational axis is part of a suspension device 8, which is designed for turning the tilting floor 1, and consequently pivoted (e.g., in corresponding side panels). The rotational axis rigidly joins the first and second lateral walls, thereby yielding a stable structure that is able to withstand strong forward and reverse accelerations of the kind that might arise when an aircraft crashes, for example. Given a strong braking effect, for example, corresponding forces conveyed by the carry-on baggage 6 to the second lateral wall 5 may here be partially deflected to the first lateral wall 4 via the rotational axis. This results in an elevated stability for the luggage compartment.

Furthermore, the luggage compartment encompasses a flap 2, which, as shown on FIG. 1, may assume an open position. The flap 2 may also assume a closed position, in which it may be locked. The tilting floor 1 may be turned from an initial position after opening the flap 2 into a loading/unloading position (as shown on FIG. 1). In this loading position, carry-on baggage may be comfortably loaded and unloaded, since a loading edge (front side) of the tilting floor is lowered.

The tilting floor 1 also comprises a rear wall 3, which limits the luggage compartment from below.

Figure 2:
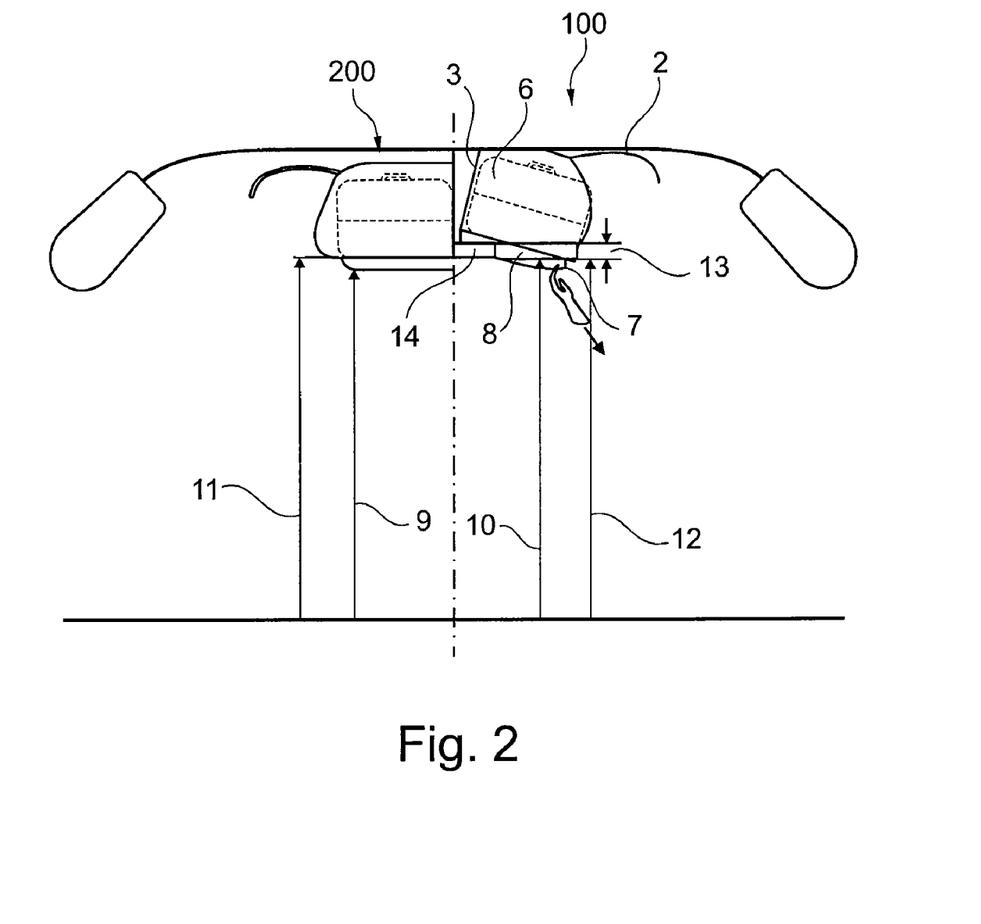
FIG. 2 shows a diagrammatic cross sectional view of a luggage compartment arrangement.

FIG. 2 shows a diagrammatic cross sectional view of a luggage compartment arrangement. Reference number 200 here denotes a conventional luggage compartment, while reference number 100 denotes an example of a luggage compartment described in the specification.

A luggage rack in a wide-bodied aircraft may be determined by three criteria, specifically, a defined stowage volume, an installation height (headroom/standing height) and a loading edge height.

As may be seen from FIG. 2, the standing height or headroom 10 in the luggage compartment 100 with the tilting floor according to the invention is increased relative to the headroom 9 for the known luggage compartment 200. The increased headroom measures 6 to 10 cm, for example, but can also be higher (e.g., depending on the maximum tilting angle $\alpha$). This also allows taller people to stand under the luggage compartment without hunching over. This increases passenger comfort significantly.

In addition, a loading edge height 12 of the tilting floor luggage compartment arrangement 10 is reduced in the aircraft luggage compartment relative to the loading edge height 11 of the conventional luggage compartment 200. The reduction may here measure several centimeters depending on the position of the bearing arrangement 8, the installation height of the luggage compartment 100, and the maximum tilting angle $\alpha$.

According to an embodiment, the loading edge height 12 does not wander upward regardless of the elevated suspension of the luggage compartment, but rather (as compared with the conventional compartment 200) even migrates downward, as denoted by reference number 13. This further enables a comfortable loading.

Actuating a lock 7 initially opens the flap 2, while the floor still remains horizontally locked. Only when the lock 7 is again actuated and given a downward pulling motion, does the floor tilt into the desired loading/unloading position.

After loading is complete, the floor is manually pressed up over a dead center (threshold force). This threshold force may be generated, for example, by having a portion of the loading weight lie behind the fulcrum, but may also be provided by means of a dampening spring. For example, a spring arrangement (not shown on FIG. 2) may be provided for heavy carry-on baggage to support a rotating motion of the tilting floor. Further, the spring arrangement may be used to set a minimum required threshold force for turning the tilting floor (dead center).

The flap may only be closed once the tilting floor has returned to the automatically locked initial position. This may simultaneously serve as a safety check, since a closed flap tells the flight personnel that the tilting floor is correctly locked.

Provided as an example is a coupling means that couples a first locking device for locking the tilting floor with a second locking device for locking the flap. The coupling means may involve a toothed belt linkage between the two locking mechanisms, so that the first locking device may only be released once the second locking device has been released. In addition, the coupling means may be designed in such a way that the second locking device may only be closed once the first locking device has been closed.

It should be noted, that the locking device for locking the floor and the locking device for locking the flap may not be coupled. For example, the locking device for locking the flap may be adapted as a normal locking mechanism for the flap. When the locking mechanism has been released and the flap is opened, the other locking device (for the tilting floor) may be laid open, since the flap has moved away from the other locking device. Then, the other locking device (for the tilting floor) may be released in order to allow the tilting floor to turn around the suspension device.

In an embodiment, the first locking device may be locked automatically by turning the tilting floor into the initial position. For example, this may be done using a snapping mechanism or the like, which automatically snaps into a corresponding counterpart once the initial position has been reached, thereby locking the tilting floor. If the tilting floor is then locked, the coupling means release the second locking device (for the flap 2).

The coupling means here encompass a handle or tongue 7, for example, which may assume three different sequential positions. The first position is here the resting position. Actuating the handle allows one to bring the handle into a second position, which releases the second locking device of the flap 2. Further moving the handle 7 then brings the handle into a third position, which releases the first locking device of the tilting floor, so that the tilting floor may now be turned into its loading position.

The turning motion of the tilting floor may be supported or dampened via corresponding pneumatic springs, for example. Naturally, however, other spring mechanisms may be used, such as rubber springs or spiral springs. Also possible are friction mechanisms, which dampen the turning motion. The pneumatic springs (or another corresponding spring or dampening means) may be used to support the rotational process of the tilting element, but also for dampening it. Further, the spring means may be adjustable, so that the threshold force may be set correspondingly, and hence is independent of the loaded status of the luggage compartment, for example.

As evident from FIG. 2, suspending the luggage compartment as described creates a free space 14 that may be used, for example, for a passenger service unit channel (PSU channel).

Figure 3:
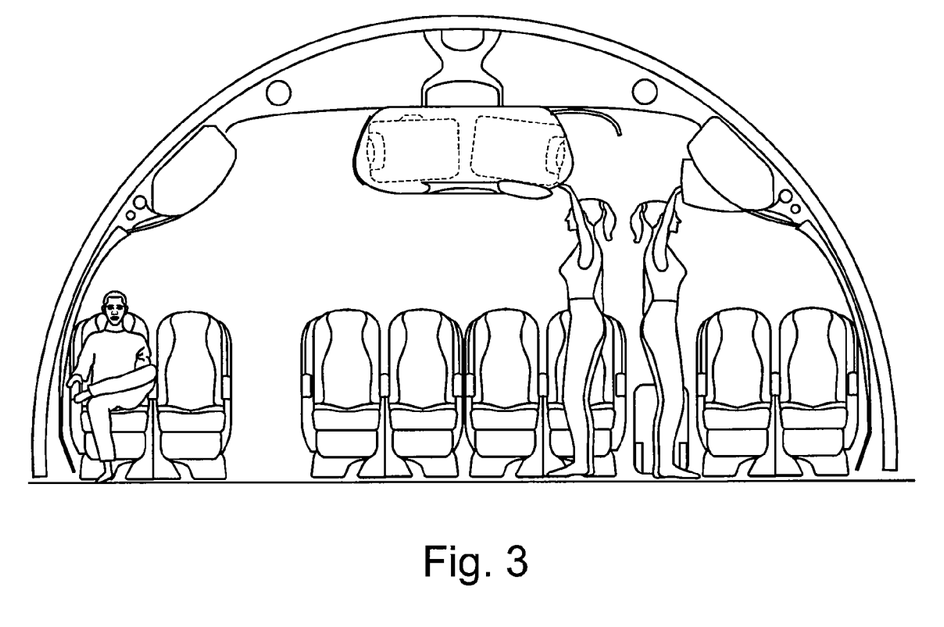
FIG. 3 shows a diagrammatic cross sectional view of a luggage compartment arrangement in an aircraft fuselage.

FIG. 3 shows a diagrammatic cross sectional view of a luggage compartment arrangement in an aircraft fuselage. As evident from FIG. 3, the swivel-mounted tilting floor arrangement may be comfortably flipped down for loading or unloading carry-on baggage. This increases passenger comfort, for example, by increasing the headroom under the flipped-up luggage compartments.

Figure 4A:
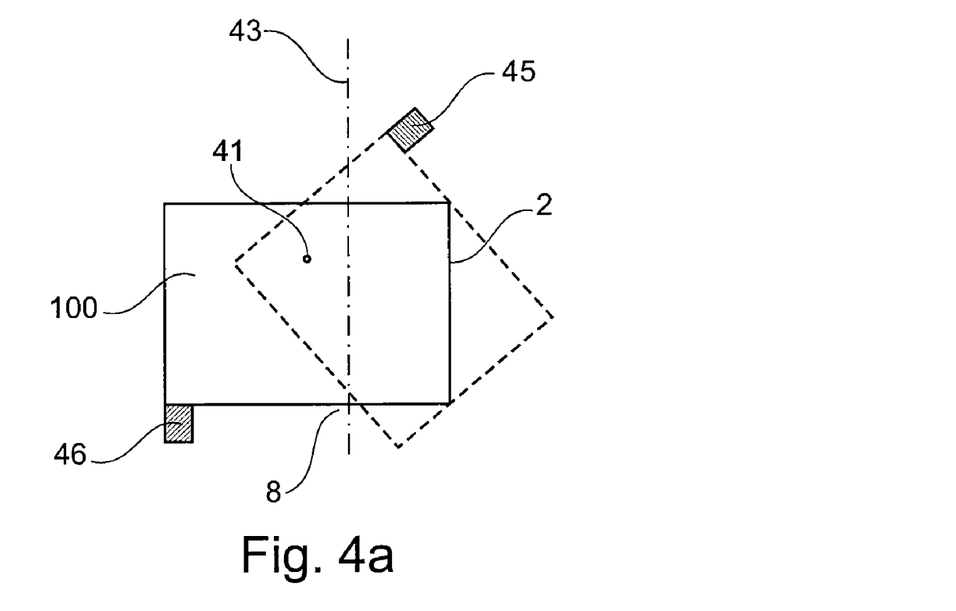
FIG. 4a-4b show diagrammatic cross sectional views of a luggage compartment according to another embodiment.
Figure 4B:
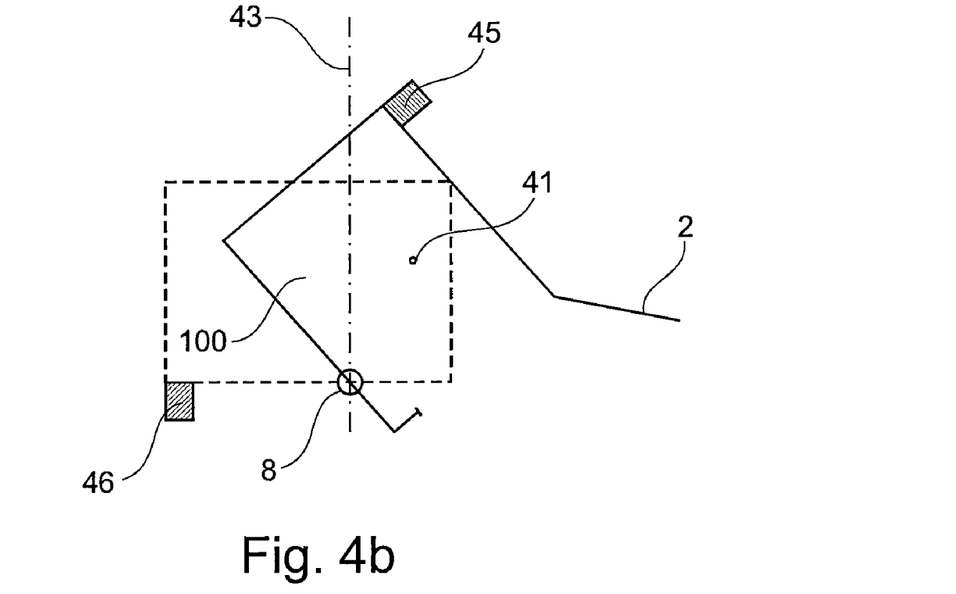
Figure 5:
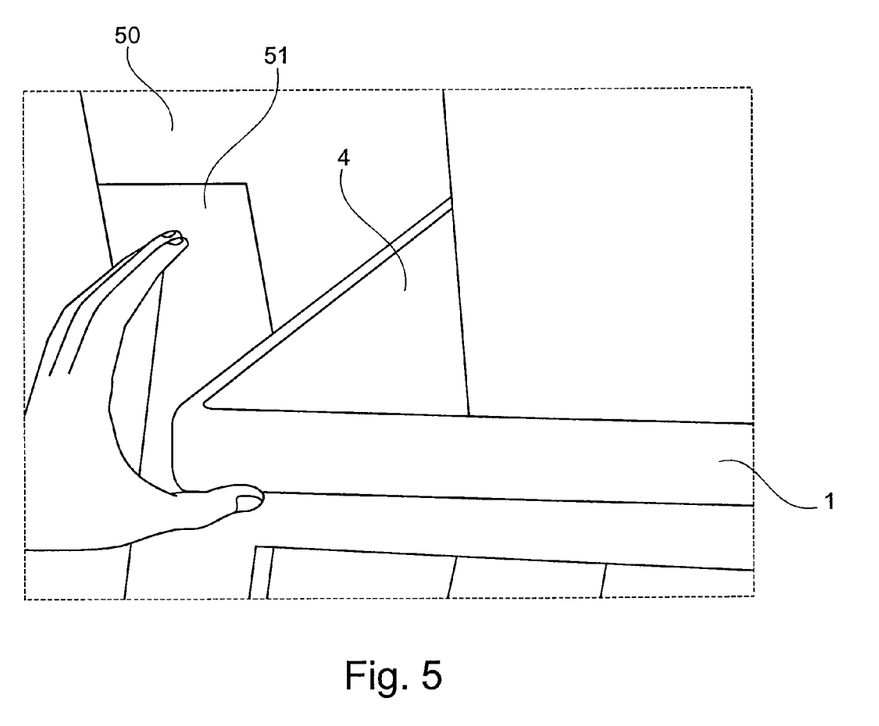
FIG. 5 shows a diagrammatic partial view of a luggage compartment with a recess on a side panel.

FIG. 4a-4b show diagrammatic cross sectional views of a luggage compartment arrangement according to an embodiment. As evident from FIG. 4a, the luggage compartment 100 with tilting floor has a rotating suspension device 8, which defines a rotational axis of the luggage compartment 100. The center of gravity of the luggage compartment 100 symbolized in its initial position by the continuous lines on FIG. 4a is marked with reference number 41. As evident from FIG. 4a, the center of gravity 41 is laterally shifted to the left relative to the line 43 via the fulcrum 8. As a result, the tilting floor is in a stable position, since the lateral shift in the center of gravity 41 away from the horizontal line 43 causes a torque to act counterclockwise on the tilting floor or luggage compartment 100, which presses the luggage compartment 100 against a fixed stop 46.

As may be seen from FIG. 4b, the center of gravity 41 of the luggage compartment 100 in the loading position (shown after having opened the flap 2 and turning the tilting floor or luggage compartment 100 from the initial position on FIG. 4a) is situated in the end position (see FIG. 4b) shifted laterally to the right relative to the horizontal axis 43 via the fulcrum 8. As a result, the tilting floor is in a stable position even in this position, since the torque acts on it clockwise, thereby pressing the tilting floor against the fixed stop 45. Given the relative proximity of the center of gravity to the horizontal axis 43, only a relatively low force is ever necessary for the rotational motion. Mechanically complex and heavy dampening means or force enhancing means may hence be largely omitted.

In an exemplary embodiment according to this invention, the first locking device can be locked automatically by turning the tilting floor into the initial position. For example, this can be done using a snapping mechanism or the like, which automatically snaps into a corresponding counterpart once the initial position has been reached, thereby locking the tilting floor. If the tilting floor is then locked, the coupling means release the second locking device (for the flap 2).

In order to load or unload the luggage compartment, a locking device is first released to disengage the flap 2 of the luggage compartment. This makes it possible to open the flap 2. After the flap has been opened, a second locking device is released, allowing the tilting floor 1 of the luggage compartment to be tilted from an initial position into a loading position. The first and second locking device are here joined with a handle 7 via a coupling means, wherein the coupling means is designed in such a way that the first locking device may only be released once the second locking device has been released, and that the second locking device may only be locked once the first locking device has been closed. After the tilting floor has arrived at the loading or unloading position, the baggage may be pushed into or taken out of the luggage compartment. A threshold force must then be exerted to turn the tilting floor back to the initial position. When the initial position has been assumed, the first locking device automatically latches to lock the tilting floor, and the flap may be closed. After the flap 2 is closed, the flap 2 is automatically locked by a second locking mechanism.

According to an embodiment, there are two stable states in which no restoring force acts. The first state is shown on FIG. 4a, in which the acting force actually works counterclockwise, which would cause the tilting element to turn up further if no stop element 46 were provided. The second stable position is shown on FIG. 4b, in which the force acts on the tilting element clockwise, so that a tilting motion would continue if a second stop element 45 were not to halt this tilting motion. Therefore, a stable state is also shown on FIG. 4b.

Torsion dampeners may also be used as the spring arrangement.

Gaps between the inner lateral walls may be covered by a profile. A gap on the rear side of the luggage compartment may be covered by a movable panel (e.g., see 15 on FIG. 1). The luggage compartment may be unlocked by means of a handle or slide-out tongue, wherein the door is unlocked by about 30% after the tongue is withdrawn, for example, and the tilting floor is unlocked by another 30% while continuing to withdraw the tongue. For example, the handle may be designed as a handrail, which the user may use to pull down the tilting floor after withdrawn 60%. This handrail may take up the entire width of the luggage compartment, for example.

The handrail may advantageously encompass a seat or seat row number, which is legible from the both with the tilting floor flipped up or down. In one example, typical forces needed to open or tilt the tilting floor may measure 200 Newtons, for example.

Figure 6A:
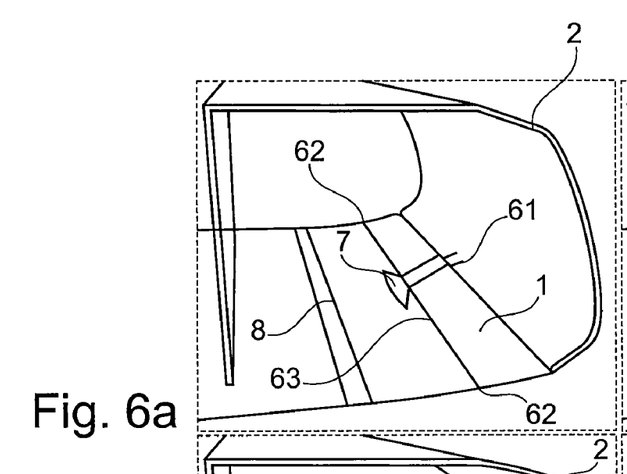
FIG. 6 shows a diagrammatic view of the actuation principle for the first and second locking devices with coupling means.
Figures 6B, 6D:
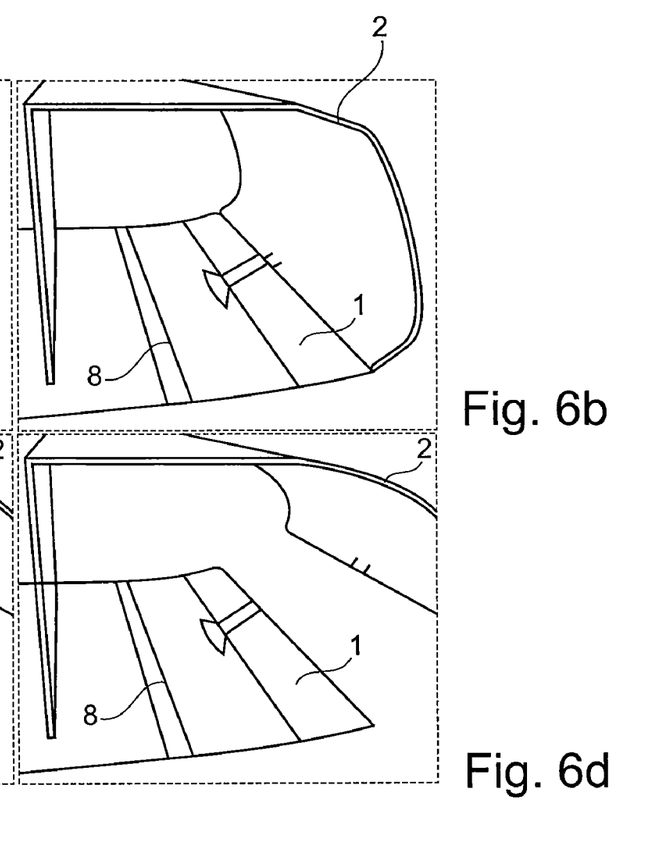
Figure 6C:
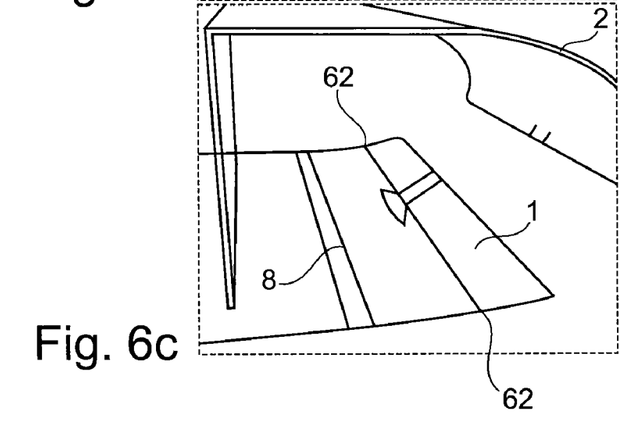

FIG. 6 shows a diagrammatic view of the actuating principle for the first and second locking devices with coupling means. As discernible from FIG. 6a, both the first locking device 62 located on the lateral walls of the luggage compartment and the second locking device 61 located on the flap 2 of the luggage compartment are closed in the initial state. The two locking devices 61, 62 are coupled together via a coupling means 63 comprising the handle 7. The door 2 is unlocked by actuating the handle 7 (shifting from the first position shown on FIG. 6a into the second position shown on FIG. 6b). FIG. 6c shows how the handle, and hence the coupling means, is moved into the third position via the two locking devices 61, 62, in which the first locking device 62 opens on both sides of the luggage compartment, so that the tilting floor 1 may now be tilted. This is depicted on FIG. 6d, in which the handle and the coupling means have been moved further down into a fourth position, as a result of which the tilting floor 1 is turned around the suspension device 8 and tilted downward.

Figure 7:
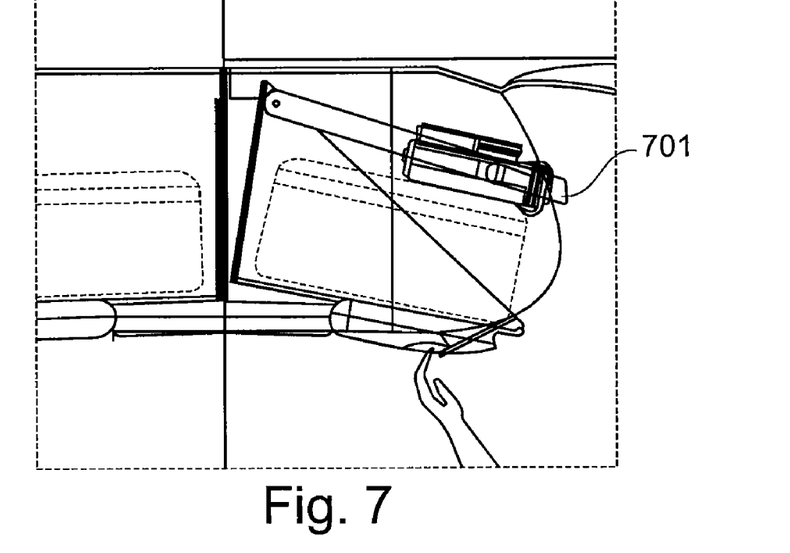
FIG. 7 shows a schematic representation of a luggage compartment according to another embodiment.
Figure 8:
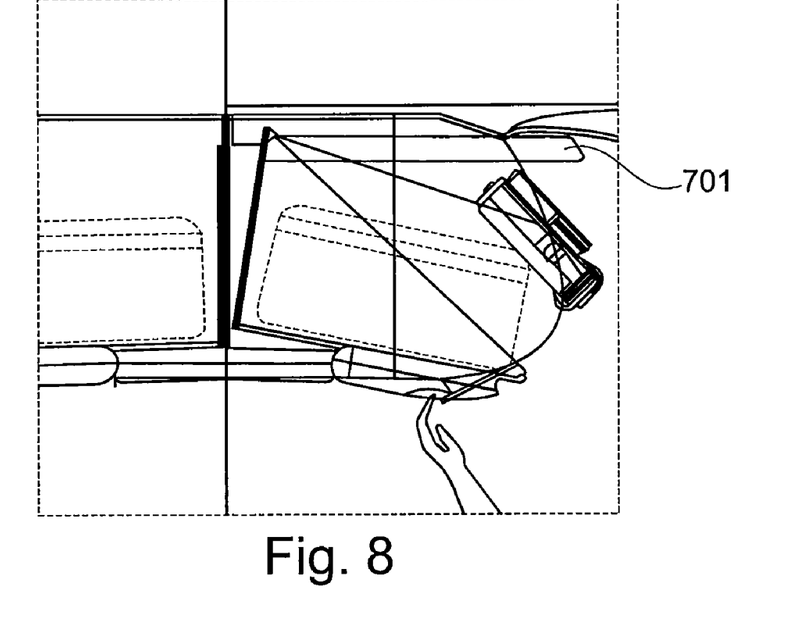
FIG. 8 shows the embodiment of FIG. 7 in another state of use.

FIG. 7 and FIG. 8 show an other embodiment. The luggage compartment further comprises a frame member 701 or holder which is rotatably attached to the tilting floor and adapted for preventing a piece of luggage to slip out of the compartment when the floor is tilted. For that reason, the frame 701 follows the tilting movement of the floor after the flap is opened, thereby holding back the luggage, as depicted in FIG. 7. As may be seen from FIG. 8, the frame member 701 may be rotated upwards in order to access the luggage or to load/unload the compartment. It should be noted the other mechanisms for fixing and/or moving the frame may be used, such as, for example, a sliding mechanism which allows the frame member 701 to be moved upwards when the luggage as to be accessed.

Alternative combinations and variations of the examples provided will become apparent based on the disclosure. It is not possible to provide specific examples for all of the many possible combinations and variations of the embodiments described, but such combinations and variations may be claims that eventually issue.

In addition, it must be noted that "comprising" does not exclude any other elements or steps, and "one" or "a" do not exclude a plurality. Further, let it be noted that features or steps that have been described with reference to one of the above embodiments may also be used in combination with other features or steps of other embodiments described above. Reference numbers in the claims are not to be regarded as limiting.

The invention claimed is:

1. A luggage compartment for an aircraft, comprises:
    a tilting floor;
    a flap having an open position and a closed position; and
    a suspension device;
    wherein the tilting floor is coupled to the suspension device such that the tilting floor is capable of rotating on the suspension device around a suspension axis from an initial position to a loading position, when the flap is in the open position.

2. The luggage compartment according to claim 1, further comprising:
    a first locking device having a locked position and an unlocked position wherein the first locking device locks the tilting floor in the initial position and prevents the tilting floor from rotating on the suspension device, when the first locking device is in the locked position, and the tilting floor is;
    released to allow the tilting floor to rotate on the suspension device, when the first locking device is in the unlocked position.

3. The luggage compartment according to claim 2, wherein the locked position of the first locking device is automatically engaged by rotating the tilting floor to the initial position.

4. The luggage compartment according to claim 3, further comprising:
    a second locking device wherein the flap is latched in the closed position by the second locking device in a latched position and is released to allow the flap to move to the open position, when the second locking device has been released.

5. The luggage compartment according to claim 4, further comprising:
    a coupling device coupling the first locking device with the second locking device; such that the first locking device is releasable only when the second locking device has been released, and
    the flap and the second locking device capable of returning to the latched position only when the first locking device is in the locked position.

6. The luggage compartment according to claim 5, wherein the coupling device comprises a handle and the handle has a first position, a second position and a third position, such that the first position is the latched position of the coupling device and the flap, and moving the handle to the second position releases the flap from the latched position such that the flap may be moved to the open position and the third position releases the first locking device from the locked position, such that the tilting floor is rotatable on the suspension device and the handle moves from the first position to the second position to the third position in sequence.

7. The luggage compartment according to claim 1, wherein the suspension device is positioned with respect to an imaginary line that runs vertically through the center of gravity of the luggage compaitment when the tilting floor is in the initial position, such that the tilting floor is rotatable on the suspension device using only a slight torque applied to the tilting floor, a slight torque being defined in the range of torques that a normal passenger could apply using a single finger without use of any other bias torque.

8. The luggage compartment according to claim 1, wherein the suspension device comprises a rotational axis; and
    the tilting floor comprises a first lateral wall and a second lateral wall;
    wherein the rotational axis rigidly joins the first lateral wall and second lateral wall, such that forward forces and reverse forces produced during aircraft accelerations are absorbed by the first lateral wall, the second lateral wall and the rotational axis.

9. The luggage compartment according to claim 1, further comprising:
    a spring arrangement wherein the spring arrangement is coupled to the tilting floor and the suspension device such that the spring arrangement exerts a minimum threshold force required for rotating the tilting floor.

10. The luggage compartment according to claim 1, further comprising:

a frame member coupled to a structure of the luggage compartment such that the frame member prevents luggage stored in the luggage compartment from sliding out of the luggage compartment when the tilting floor is in the loading position.

11. An aircraft comprising a luggage compartment according to claim 1.

12. A method for actuating a luggage compartment on board an aircraft, comprising:
 releasing a second locking device for opening a flap of the luggage compartment;
 releasing a first locking device for rotating a tilting floor of the luggage compartment around a suspension axis from an initial position into a loading position;
 loading of baggage into the luggage compartment;
 applying a threshold force for rotating the tilting floor back into the initial position;
 closing the first locking device for locking the tilting floor;
 closing the flap; and
 latching the second locking device and the flap such that the flap closes the luggage compartment.

13. The method according to claim 12, wherein the first locking device and the second locking device are coupled and the step of releasing the first locking device is prevented until after the step of releasing the second locking device is completed; and the step of latching the second locking device is prevented until after the step of closing the first locking device has been completed.

* * * * *

UNITED STATES PATENT AND TRADEMARK OFFICE
CERTIFICATE OF CORRECTION

| | | |
|---|---|---|
| PATENT NO. | : 7,823,830 B2 | Page 1 of 1 |
| APPLICATION NO. | : 11/813521 | |
| DATED | : November 2, 2010 | |
| INVENTOR(S) | : Erich Feldkirchner | |

It is certified that error appears in the above-identified patent and that said Letters Patent is hereby corrected as shown below:

Col. 8, claim 7, line 4, replace the word "compaitment" with: --compartment--.

Signed and Sealed this
Fourth Day of October, 2011

David J. Kappos
*Director of the United States Patent and Trademark Office*